(12) United States Patent
Bhunia et al.

(10) Patent No.: US 11,144,648 B2
(45) Date of Patent: Oct. 12, 2021

(54) TROJAN INSERTION TOOL

(71) Applicant: University of Florida Research Foundation, Inc., Gainesville, FL (US)

(72) Inventors: Swarup Bhunia, Gainesville, FL (US); Jonathan William Cruz, Gainesville, FL (US); Prabhat Kumar Mishra, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 296 days.

(21) Appl. No.: 16/358,908

(22) Filed: Mar. 20, 2019

(65) Prior Publication Data

US 2020/0302064 A1    Sep. 24, 2020

(51) Int. Cl.
*G06F 21/00* (2013.01)
*G06F 21/57* (2013.01)
*G06F 21/71* (2013.01)

(52) U.S. Cl.
CPC ............ *G06F 21/577* (2013.01); *G06F 21/71* (2013.01); *G06F 2221/034* (2013.01)

(58) Field of Classification Search
CPC .............................. G06F 21/577; G06F 21/71
See application file for complete search history.

(56) References Cited

U.S. PATENT DOCUMENTS

2011/0113392 A1*  5/2011  Chakraborty ......... G06F 30/327
716/102

* cited by examiner

*Primary Examiner* — Jeffrey C Pwu
*Assistant Examiner* — Thong P Truong
(74) *Attorney, Agent, or Firm* — Thomas | Horstemeyer, LLP

(57) ABSTRACT

A method and system for evaluating software tools that detect malicious hardware modifications is provided. In one embodiment, among others, a system comprises a computing device and an application. The application causes the computing device to at least receive hardware description language code that represents a circuit design and calculate a signal probability for one or more nodes in the circuit design. The application also causes the computing device to identify one or more rare nodes in the circuit design and generate a Trojan sample population. The application further causes the computing device to generate a feasible Trojan population and generate a Trojan test instance based at least in part on a random selection from the Trojan feasible population. Additionally, the application causes the computing device to generate modified hardware description code from the Trojan test instance.

20 Claims, 11 Drawing Sheets

Algorithm 1 Dynamic Trojan Insertion Algorithm

1: Input: Design $D$, set of config param. $C\{q,r,\theta,N,...\}$
2: Output: Trojan inserted design $T$
3: procedure TROJANINSERTION($D, C$)
4:     $rareNode, sampleTrojPop=\{\}$
5:     $hypergraph$ = constructGraph($D$)
6:     topologicalSort($hypergraph$)
7:     $stats$ = functionalSim($hypergraph$)
8:     for each $node \in hypergraph$ do
9:         if $node.signalProb \leq \theta$ then
10:             $rareNode \cup node_i$
11:     $trigPop = [rareNode]^r + [node\hat{\ }rareNode]^{q-r}$
12:     $sampleTrigPop$ = sample($trigPop$, 10000)
13:     for each $trigger \in sampleTrigPop$ do
14:         if !validTrigger($trigger_i$) then
15:             removeTrig($trigger_i$, sampledTrigPop)
16:         else
17:             $payload$=findRandomPayload($hypergraph$)
18:             while !validPayload(payload) do
19:                 $payload$=findRandomPayload($hypergraph$)
20:                 if allVisited($hypergraph$) then
21:                     removeTrig($trigger_i$, sampledTrigPop)
22:             $sampleTrojPop \cup (trigger_i + payload)$
23:     $T$ = constructTrojans($D, C$)
24:     return $T$

FIG. 1B

Configurable Trojan insertion Tool Parameters

| Parameter | Effect | Objective |
|---|---|---|
| No. of trigger node (q) | Trigger | Affects Trigger probability and Trojan complexity |
| No. of rare trigger node (r) | Trigger | Affects Trigger probability and Trojan complexity |
| Rare signal threshold (θ) | Trigger | Affects Trigger probability and Trojan complexity |
| No. of Trojans (N) | Trigger | Affects Trigger probability and No. of available trigger nodes |
| Activation Mechanism (Triggered/ Always On) | Trigger & Payload | Affects Trigger probability and Trojan structure |
| Trojan Effect (Functional/ Leakage) | Trigger | Affects overall Trojan complexity and potential effect |
| Trojan Structure (combs/seq/analog) | Payload | Affects Trojan complexity and payload effect |
| | Trigger & Payload | Affects overall Trojan complexity, payload effect and detectability |

FIG. 1C

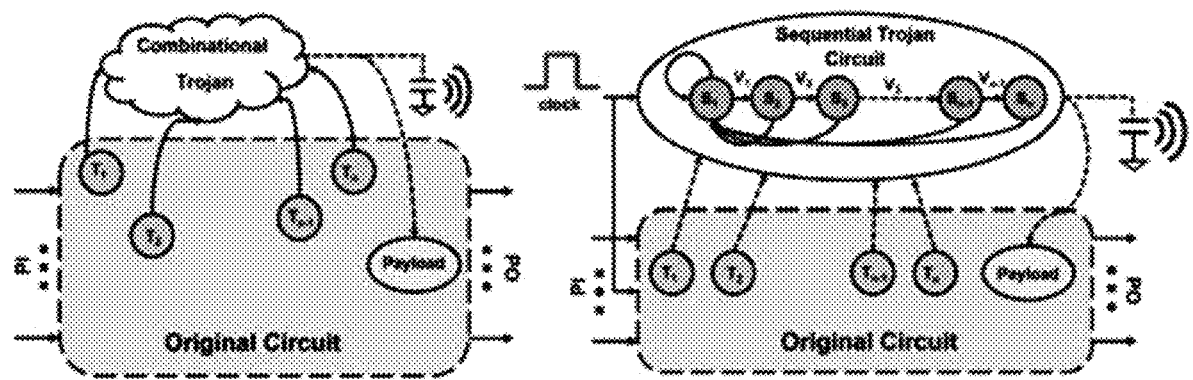
FIG. 2A  FIG. 2B

```
and2s1 temp1Trig1 (.Q(trig01), .DIN1(in[0]),
    .DIN2(in[1]));
and2s1 temp1Trig2 (.Q(trig02), .DIN1(in[2]),
    .DIN2(in[3]));
dffs1 temp1Troj1 (.Q(troj0), .CLK(CK),
    .DIN(trig01));
dffs1 temp1Troj2 (.Q(troj1), .CLK(CK),
    .DIN(trig02));
and2s1 temp1Troj3 (.Q(troj2), .DIN1(troj0),
    .DIN2(troj1));
dffs1 temp1Troj4 (.Q(troj3), .CLK(CK),
    .DIN(troj2));
xor2s1 temp1Payload (.Q(payload),
    .DIN1(original), .DIN2(troj2));
```

FIG. 3A

```
hi1s1 inv0 (.Q(iOut1), .DIN(n15));
and2s1 temp1Trig1 (.Q(trig01), .DIN1(n17),
    .DIN2(iOut1));
and2s1 temp1Trig2 (.Q(trig02), .DIN1(n12),
    .DIN2(n18));
dffs1 temp1Troj1 (.Q(troj0), .CLK(CK),
    .DIN(trig01));
dffs1 temp1Troj2 (.Q(troj1), .CLK(CK),
    .DIN(trig02));
and2s1 temp1Troj3 (.Q(troj2), .DIN1(troj0),
    .DIN2(troj1));
dffs1 temp1Troj4 (.Q(troj3), .CLK(CK),
    .DIN(troj2));
xor2s1 temp1Payload (.Q(n26),
    .DIN1(n26_temp), .DIN2(troj2));
```

FIG. 3B

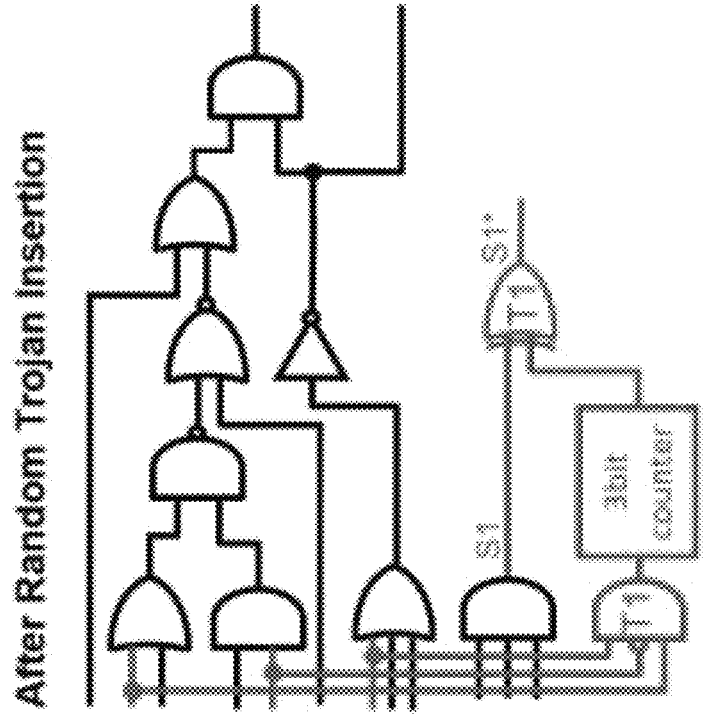
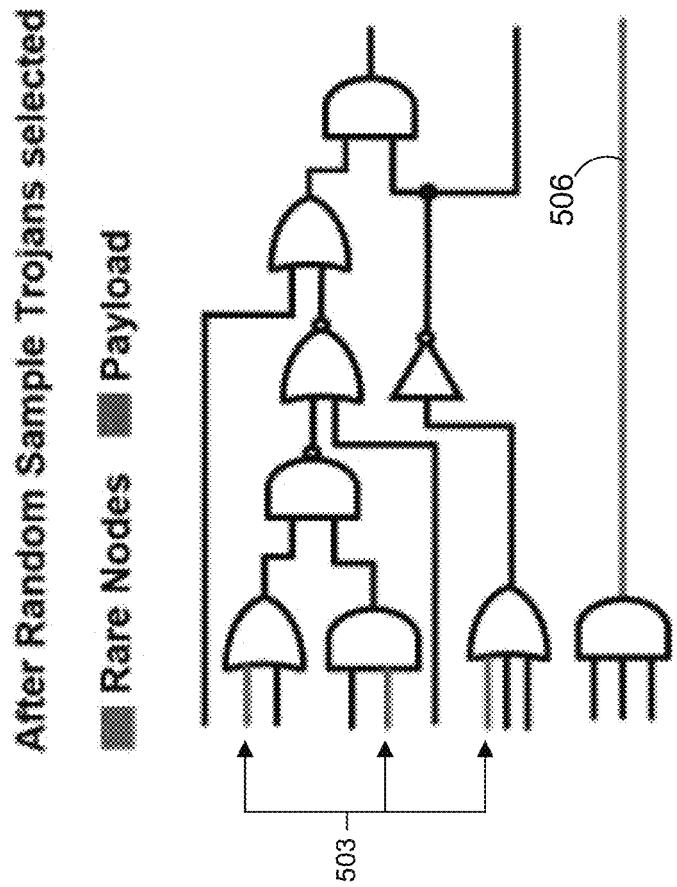
FIG. 5B
FIG. 5A

Analysis of COTD with Random Trojan Insertions

| Benchmarks | Trig. (t/q) | θ | Type | No. Genuine Signals (FN) | No Trojan Signals (FP) | Trjp. Cltr. 1 Cntr. <C,C,O> | Trjp. Cltr. 2 Cntr. <C,C,O> | Genuine Sig. [C,C,O] (min,max) | Trjp. Sig. [C,C,O] (min,max) |
|---|---|---|---|---|---|---|---|---|---|
| s13207-c5_6 | 5/6 | 0.000 | comb | 2185(0) | 544(538) | <7.16, 20.61> | <8.46, 44.74> | (1.41, 73.56) | (56.93, 71.19) |
| s13207-c6 | 6/6 | 0.000 | comb | 2197(0) | 545(538) | <6.94, 20.67> | <8.89, 45.18> | (1.41, 63.02) | (62.78, 84.08) |
| s13207-c7 | 7/7 | 0.000 | comb | 2194(0) | 547(539) | <7.46, 20.78> | <8.72, 46.25> | (1.41, 114.02) | (72.48, 122.06) |
| s13207-s5_6 | 5/6 | 0.000 | seq | 2739(0) | 20(0) | <359.21, 191.25> | <23.81, 254> | (1.41, 254.39) | (254, 439.94) |
| s13207-s6 | 6/6 | 0.000 | seq | 2738(0) | 19(0) | <359.21, 191.25> | <33.09, 255> | (1.41, 254.39) | (254, 439.94) |
| s13207-s7 | 7/7 | 0.000 | seq | 2738(0) | 19(0) | <359.21, 191.25> | <33.75, 254> | (1.41, 254.39) | (254.33, 439.94) |
| s15850-c5_6 | 5/6 | 0.000 | comb | 2780(0) | 737(722) | <10.03, 52.26> | <7.23, 19.61> | (1.41, 139.72) | (50.13, 64.10) |
| s15850-c6 | 6/6 | 0.000 | comb | 2812(0) | 518(510) | <96.16, 22> | <8.61, 18.87> | (1.41, 139.72) | (82.64, 105.06) |
| s15850-c7 | 7/7 | 0.000 | comb | 2915(0) | 515(507) | <111.68, 13> | <8.75, 19.03> | (1.41, 139.72) | (92.80, 151.10) |
| s15850-s5_6 | 5/6 | 0.000 | seq | 3419(0) | 21(0) | <347.52, 70.33> | <23.48, 254> | (1.41, 254.03) | (254.10, 439.94) |
| s15850-s6 | 6/6 | 0.000 | seq | 3418(0) | 21(4) | <359.21, 191.25> | <25.45, 254> | (1.41, 254.03) | (254.16, 439.94) |
| s15850-s7 | 7/7 | 0.000 | seq | 3419(0) | 20(3) | <359.21, 191.25> | <25.96, 254> | (1.41, 254.03) | (254.05, 439.94) |
| s35932-c5_6 | 5/6 | 0.05 | comb | 5185(0) | 3173(3163) | <3.83, 4.78> | <2.27, 9.59> | (1.41, 80.02) | (31.97, 43.35) |
| s35932-c6 | 6/6 | 0.05 | comb | 5185(0) | 3173(3163) | <3.85, 4.78> | <2.38, 9.62> | (1.41, 59.02) | (36.06, 52.28) |
| s35932-c7 | 7/7 | 0.05 | comb | 5185(0) | 3173(3163) | <3.85, 4.78> | <2.39, 9.70> | (1.41, 61.02) | (37.22, 54.27) |
| s35932-s5_6 | 5/6 | 0.05 | seq | 8341(0) | 25(7) | <359.21, 191.5> | <10.91, 254> | (1.41, 254.1) | (254.02, 439.94) |
| s35932-s6 | 6/6 | 0.05 | seq | 8341(0) | 20(8) | <359.21, 191.5> | <11.71, 254> | (1.41, 254.13) | (254.1, 439.94) |
| s35932-s7 | 7/7 | 0.05 | seq | 8341(0) | 26(7) | <359.21, 191.5> | <13.41, 254> | (1.41, 254.13) | (254.1, 439.94) |

FN is False Negative, FP is False Positive

FIG. 8

TROJAN INSERTION TOOL

STATEMENT REGARDING FEDERALLY SPONSORED RESEARCH OR DEVELOPMENT

This invention was made with government support under grant numbers 1441667, 1603483, and 1623310 awarded by the National Science Foundation. The government has certain rights in the invention.

BACKGROUND

With research in hardware security and trust increasing in recent years, hardware test benchmarks serve as an important tool for researchers to assess the effectiveness of their proposed methodologies by providing a standardized baseline. Traditionally, Trojans have been inserted in an ad-hoc manner into pre-silicon designs. This fact prevents effective comparison among Trojan detection methods because an ad-hoc Trojan can favor one detection methodology over another. Some efforts have attempted to remedy this by offering a benchmark suite with a fixed number of Trojan inserted designs.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1B is one example of an algorithm for the Trojan benchmark application, according to various embodiments of the present disclosure.

FIG. 1C is one example of Trojan Insertion Tool Parameters, according to various embodiments of the present disclosure.

FIG. 2A illustrates one example of a combinational Trojan instance, according to various embodiments of the present disclosure.

FIG. 2B illustrates one example of a sequential Trojan instance, according to various embodiments of the present disclosure.

FIGS. 3A and 3B illustrates one example of a Netlist template before and after insertion of a Trojan instance, according to various embodiments of the present disclosure.

FIGS. 5A and 5B illustrates a circuit design after a sequential Trojans has been selected and inserted, according to various embodiments of the present disclosure.

FIG. 8 illustrates an exemplary analysis of a third party hardware Trojan detection program, according to various embodiments of the present disclosure.

DETAIL DESCRIPTION

Figure 1A:
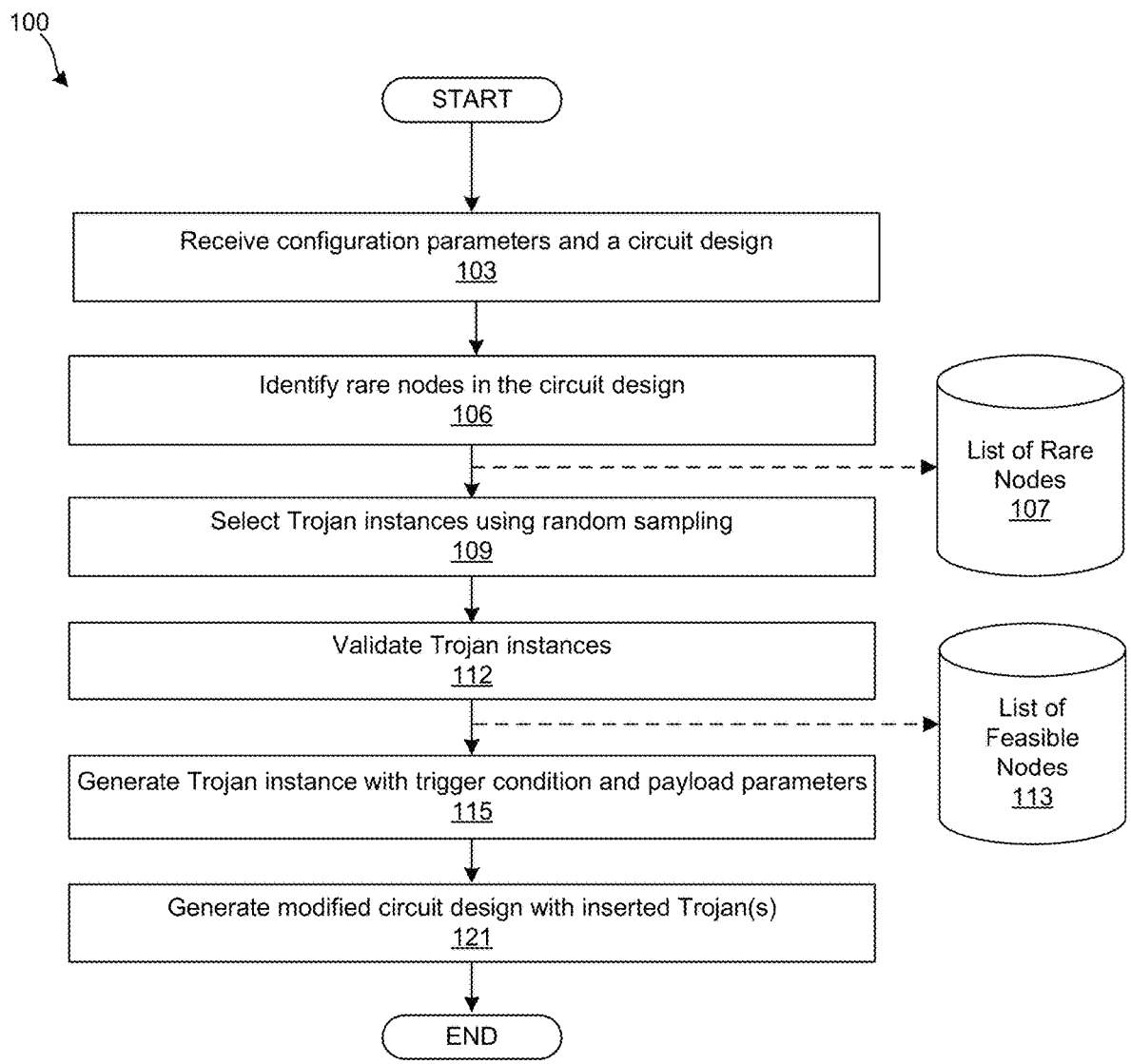
FIG. 1A is a flowchart illustrating one example of functionality implemented as portions of a Trojan benchmark application executed in a computing environment, according to various embodiments of the present disclosure.

Disclosed herein are various embodiments related to a dynamic Trojan insertion application for evaluating software tools that detect malicious hardware modifications (e.g. Trojans) in circuit designs. Malicious hardware modifications, also known as a hardware Trojan attack, has emerged as a serious security concern for electronic systems. These attacks compromise the basic premise of hardware as a root of trust. Significant research efforts have been directed to carefully analyze the trust issues arising from hardware Trojans and to protect against them. The solutions that have emerged from these efforts often need to rely on a well-defined set of trust benchmarks that can reliably evaluate the effectiveness of the protection methods. In recent past, efforts have been made to develop a benchmark suite to analyze the effectiveness of pre-silicon Trojan detection and prevention methodologies. However, there are only a limited number of Trojan inserted benchmarks available. Moreover, there is an inherent bias as the researcher can be aware of Trojan properties such as location and trigger condition since the current benchmarks are static. In order to create an unbiased and robust benchmark suite to evaluate the effectiveness of any protection technique, the various embodiments relate to a comprehensive framework of automatic hardware Trojan insertion. Given a netlist or some other hardware description code representative of a circuit design, the various embodiments relate to a framework that will automatically generate a design with one or more Trojan instances based on user-specified Trojan properties. The various embodiments of the present disclosure allow a wide variety of configurations, such as the type of Trojan, Trojan activation probability, number of triggers, and choice of payload. The embodiments can ensure that the inserted Trojan is a valid one and allow for provisions to optimize the Trojan footprint (area and switching). Experiments demonstrate that a state-of-the-art Trojan detection technique provides poor efficacy when using benchmarks generated by our tool.

With research in hardware security and trust increasing in recent years, benchmarks serve as an important tool for researchers to assess the effectiveness of their proposed methodologies by providing a standardized baseline. Traditionally, Trojans have been inserted in an ad-hoc manner into pre-silicon designs. This fact prevents effective comparison among Trojan detection methods because an ad-hoc Trojan can favor one detection methodology over another. Efforts have attempted to remedy this by offering a benchmark suite with a fixed number of Trojan-inserted designs. However, existing trust benchmarks have the following major deficiencies: (1) These benchmarks only enumerate a subset of the possible hardware Trojans. There exists an inherent bias in these designs as the Trojan location and trigger conditions are static. As a result, it is possible for researchers to tune their methods (often unknowingly) to detect these Trojans. (2) A static set of benchmarks also prevents the incorporation of new types of Trojans in this rapidly evolving field, which keep discovering new Trojan structures. (3) A limited number of benchmarks can negatively affect supervised machine learning techniques for Trojan detection which require an expansive test set. (4) Finally, the existing set does not allow inserting multiple Trojans in a design or inserting Trojan in a different design, e.g. a new intellectual property (IP) block.

In order to make a more robust and flexible Trust benchmark suite, the various embodiments related to a novel framework to dynamically insert various functional Trojan types into a gate-level design or some other suitable hardware description code representative of a circuit design. The possible Trojans that can be inserted using the embodiments of the present disclosure can vary in terms of the Trojan type (e.g., combinational, sequential, etc.), the number of Trojans, detection difficulty, number and rarity of trigger points, payload types, Trojan structure, and other suitable Trojan detection properties. For added flexibility and forward-compatibility, the embodiments allow users to insert a Template Trojan with a chosen payload and triggering condition from a combination of rare or non-rare nodes.

As one skilled in the art will appreciate in light of this disclosure, certain embodiments may be capable of achieving certain technical advantages, including some or all of the following: (1) improving security for integrated circuits by enabling an automated generation of Trojan instances from an entire space of possible hardware Trojans for a respective circuit design during a circuit simulation; (2) improving security for integrated circuits by enabling an increased diversity of possible Trojan instances by diversifying the triggering nodes and payloads for a Trojan instance; and (3) improving the security for integrated circuits by enabling the automatic construction of multiple and/or customized Trojan instances according to a criteria for a particular a circuit design.

With reference to FIG. 1A, shown is an exemplary overview of a framework for the various embodiments. Particularly, FIG. 1A illustrates a flowchart that provides one example of the operation of a portion of Trojan benchmark application 100, according to various embodiments. It is understood that the flowchart of FIG. 1A provides merely an example of the many different types of functional arrangements that may be employed to implement the operation of the portion of the Trojan benchmark application 100 as described herein. FIG. 1B illustrates an exemplary algorithm for implementing the Trojan benchmark application 100. FIG. 1C illustrates exemplary configuration parameters for a generating hardware Trojan instance.

To begin, box 103a represents configuration parameters that can be provided for the Trojan benchmark application 100. Some non-limiting examples include a number of trigger nodes (q), a number of rare trigger nodes (r), a number of Trojans to be inserted (N), a rare signal threshold ($\theta$), a Trojan effect (functional/leakage), an activation mechanism (activ_mech), a Trojan structure, a Trojan type, and other suitable Trojan testing parameters. FIG. 1C illustrates a Table that lists potential configuration parameters, an effect for the parameter, and a parameter objective.

Box 103b represents a particular circuit design in a hardware description language. As illustrated in FIG. 1A, the box 103b refers to a gate-level hardware description of a circuit design. In other embodiments, the hardware description language may include register transfer level code, transaction level code, and other suitable levels of hardware abstraction. The circuit design can comprise a digital circuit design, an analog design, a mixed signal design, and other suitable integrated circuit designs.

In box 106, the Trojan benchmark application 100 can identify rare internal nodes in a given netlist for a circuit design. The identification of rare internal nodes can be determined by calculating a signal probability for each node in the circuit design. The nodes with signal probabilities that are less signal probability threshold ($\theta$) can be classified as a rare internal node. In the illustrated embodiment of FIG. 1A, the Trojan benchmark application 100 involves calculating the signal probabilities with a functional simulation of the nodes in the circuit design. Additionally, the Trojan benchmark application 100 can use transition probabilities for calculating signal probabilities and other suitable techniques for calculating signal probabilities of a circuit design.

In box 109, the Trojan benchmark application 100 can select Trojan instances using random sampling. Specifically, potential Trojan instances can be generated using the principle of random sampling from the population of rare nodes and non-rare nodes if specified. In some non-examples, a random number generator function can be used as part of the selection process.

In box 112, the Trojan benchmark application 100 can generate a feasible Trojan instance list 113 by verifying trigger conditions and payloads from the sample of selected Trojan instances. Trojan instances with invalid trigger nodes can be removed from the selected Trojan instance lists. Trojan instances with invalid payloads can be removed from the selected Trojan instances lists. After the triggering nodes and the payloads have been verified, the remaining Trojan instances form the list of feasible nodes 113.

In box 115, the Trojan benchmark application 100 can generate a Trojan sample population according to a trigger condition and a payload parameters. From the list of feasible nodes 113, the Trojan benchmark application 100 can randomly generate Trojan test instances based on a combination a random selection of a set of nodes from the list of feasible nodes 113. In some non-examples, a random number generator function can be used as part of the selection process.

In box 121, the Trojan benchmark application 100 can involve inserting the one or more Trojan test instances according to a user's configuration options, which include any footprint optimization. In some embodiments, the Trojan benchmark application can modify the hardware description code initially received by inserting the Trojan test instance into the hardware description language code. The modified hardware description code can be used to evaluate a software tool that detect malicious hardware modifications. For example, the modified hardware description code can be used to evaluate with a software tool detects one or more of the Trojan instances generated by the embodiments of the present application. Then, the Trojan benchmark application 100 proceeds to the end.

The various embodiments can be used to evaluate a well-known Trojan detection technique, and show that the Trojan detection technique can fail to detect Trojans generated by the embodiments of the present disclosure while being effective to detect Trojans from static benchmarks. The embodiments relate to an improved tool flow for inserting custom Trojans with validated payloads and trigger conditions in gate-level designs. The embodiments involve the following aspects:

1) An algorithm (see FIG. 1B) has been developed and can be used for analysis and validation of potential triggers and Trojan payloads. The algorithm can interface with commercial test tools to ensure validity of random Trojans.

2) The embodiments also provide a framework that can provides a highly flexible and customizable interface for Trojan insertion based on user-specified Trojan properties. The framework allows insertion of a single Trojan instance with functional change or leakage effects.

3) The framework can be extended to allow for multiple Trojan insertions of different types on a single gate-level design. Further, the framework can make provision for optimizing Trojan footprint to make it difficult with respect to side-channel analysis based Trojan detection.

Benchmarks can provide a set of standard designs for assessing different Trojan detection and prevention methods in the hardware security community. In prior efforts in hardware Trojan research, due to a lack of well-specified benchmarks, Trojans were inserted in an ad-hoc manner in various designs that no longer allows for a fair comparison of different Trojan detection and prevention techniques. A set of 91 Trust-Hub benchmarks that come with hard-to-activate Trojans have been developed in this field. These benchmarks contain Trojans of varying size and attack models offering researchers an opportunity to test their methods. This effort in standardization for hardware trust evaluation is a step in the right direction, but there are specific limitations as described in Section I that need to be addressed. The various embodiments address these limitations by enabling the generation of a wide variety of unbiased benchmarks and offer the following benefits over a static bench mark suite:

The embodiments create a more representative model of an entire Trojan population through random and stratified sampling.

The embodiments allow for an automated red vs blue team scenario when evaluating detection methods.

The embodiments facilitate an incorporation of new Trojan attack models and structures.

A. Trojan Model

Hardware Trojans are malicious modifications of a circuit that cause undesired side-effects. Trojans (e.g. Trojan instances) can structurally comprise a trigger and a payload. Typically, an attacker will insert Trojans under hard-to-trigger conditions or rare nodes of a circuit design. Therefore, most Trojans lay dormant for a majority of an infected circuit's life-time and subsequently evade detection when using standard validation techniques. Once the trigger or activation condition is reached, the Trojan's effect is realized through the payload gate. These payload effects can be broadly classified as a functional denial of service (DoS) or information leakage.

In many cases, there are two general structures of functional Trojans: combinational and sequential. Combinational Trojans can comprise only combinational logic gates. FIG. 2A shows a generic combinational Trojan. Simultaneous activation of rare nodes T1 to Tn leads to undesired effects. Sequential Trojans can include state elements and a series of state transitions to trigger an undesired effect. In FIG. 2B, after the state transitions from S1 to Sn occur, the Trojan is activated. These state transitions can be activated from trigger nodes T1 to Tn or from just the clock signal in the case of always-on Trojans.

B. Trojan Detection

Trojan detection techniques focus on identifying Trojans that are inserted by malicious adversaries along the supply chain. The approaches can be divided into three broad categories:

Functional Testing based Trojan detection methods can involve generating test sets aimed at activating a set of rare trigger nodes and monitoring the observable points for adverse effects. Functional testing usually involves comparing the output of a suspicious design with a known specification. Formal methods have also been used in functional Trojan detection.

Side Channel Analysis techniques can observe Trojan effects in one or more physical parameters. By observing parameters such as path delay or power and comparing it with a golden model, side channel analysis can identify a Trojan in presence of process noise. Yet, if the side-channel impact of the Trojan is sufficiently small, it can be masked by the presence of process variation.

Machine learning is a promising technique which focuses on identifying and extracting relevant circuit features and applying some machine learning algorithm to distinguish between Trojan-free and Trojan-inserted designs. The machine learning technique can use a static set of benchmarks for both training and evaluation. A dynamic training and test set generated by the embodiments of the present disclosure are more representative of the potential Trojan population. Hence, the framework provided by the various embodiments can produce a higher quality training set, helping researchers to develop more accurate classifiers and effective results.

Customizable and Dynamic Trojan Insertion

Having a dynamic Trojan insertion tool can play a role in achieving a robust benchmark suite for hardware security. The Table in FIG. 1C describes the user configuration parameters and their effect on Trojan trigger and payload: rare node threshold θ, number of trigger nodes q, number of rare trigger nodes r, number of Trojan instances N, the effect, activation mechanism, and the Trojan type (combinational or sequential). Because every Trojan type cannot be included, the embodiments allow the user to specify a Template Trojan that follows a particular format. With this input the embodiments can construct the Trojan and automatically insert it into the design. In one non-limiting example, FIG. 1B shows an algorithm with four steps in an automated Trojan insertion framework. The algorithm illustrated in FIG. 1B takes a gate-level design D and the set of configuration parameters C from the Table in FIG. 1C and generates a Trojan inserted design T.

A. Identify Rare Internal Nodes

Trojans are generally difficult to detect because an adversary will likely insert a Trojan under a set of hard-to-activate internal trigger conditions. Lines 5-10 of the algorithm in FIG. 1B describe one example for identifying rare nodes. Particularly, the embodiments can first construct a hypergraph by parsing the gate-level netlist or some other hardware description language code representative of a circuit design. Next, the hypergraph can be sorted topologically. The embodiments can employ functional simulation from a set of input patterns and can compute the signal probability p for each activation level for each net. Functional simulation can comprise executing a particular netlist and/or functional models by applying input stimuli to observe the functional responses. In other embodiments, the signal probabilities can be determined from transition probability techniques and other suitable methods for determining signal probabilities for nodes in a circuit design.

Users can provide a threshold signal probability θ. All nets or nodes with a calculated signal probability $p<\theta$ can be considered rare, and therefore potential trigger conditions. If it is assumed that q trigger nodes have independent signal probabilities p, the resulting Trojan trigger probability becomes:

$$\prod_{i=0}^{q} p_i \text{ where } p_i \in \{p\}$$

Yet, smart adversaries may try to bypass this assumption by including non-rare nodes in the Trojan trigger. This modification can evade techniques which consider only rare nodes in the activation condition. Therefore, in addition to the number of trigger nodes, the embodiments allow users to specify the number of rare trigger nodes r with r⊆q. If r<q then the remaining trigger nodes will be selected from the signals with p>θ as shown in line 11 of the algorithm in FIG. 1B.

B. Selecting Trojans Using Random Sampling

Suppose m rare nodes with signal probability less than θ have been identified. If a Trojan can have q trigger nodes, then the total potential Trojan population for a given structure is the following:

$$\frac{m!}{q!(m-q)!}$$

If a combination of rare and non-rare trigger nodes for the Trojan are considered, the population becomes much larger. In order to accurately model the potential Trojan population, the embodiments can employ random sampling in line 12 of the algorithm in FIG. 1B and select a large sample size (e.g. 10,000) potential Trojan triggers.

C. Trojan Validation

Inserting potential Trojans does not guarantee an adverse effect will be observable during the lifetime of the circuit. Many Trojans will be invalid or unobservable due to imposed constraints or redundant circuitry. Therefore, the inserted Trojan can be validated. In lines 13-22 of the algorithm in FIG. 1B, the embodiments can verify both the trigger condition and payload observability to ensure the Trojan inserted is a valid Trojan. From the list of potential trigger conditions, the Trojan Benchmark application 100 remove any false trigger conditions by justifying each trigger condition. If the trigger condition results in a conflict, the trigger can be removed from the trigger pool. In some examples, the Trojan benchmarking application 100 may use various validation and/or simulation techniques for verifying the triggering conditions and payload effects. In other non-limiting examples, a third party tool can be used to verify the triggering condition and the payload effects.

For each instance in the sampled list of feasible trigger nodes, a payload can be selected randomly (e.g. via a random number generator function) from the remaining nets or nodes. The criteria for payload selection can be the topological order of the payload net must be greater than that of all the trigger nodes. This can prevent the formation of combinational loops. Additionally, to ensure observability, stuck-at fault testing can be performed for each payload. Any payload for which a stuck-at fault cannot be generated can be removed from the list of feasible payloads. After combining the validated trigger condition and payload, a list of feasible Trojans 113 exists can be generated, which can be inserted into the design. If no Trojans are possible, users can adjust the rare threshold value to include more potential Trojans.

D. Trojan Construction and Insertion

From the list of feasible Trojans, the embodiments can randomly select the trigger instance and construct the Trojan from the user specification. In some non-examples, a random number generator function can be used as part of the selection process. The user can choose between functional and leakage payload effects. For functional Trojans, there can be three Trojan structures a user can insert: combinational, sequential, and template.

Figures 4A, 4B:
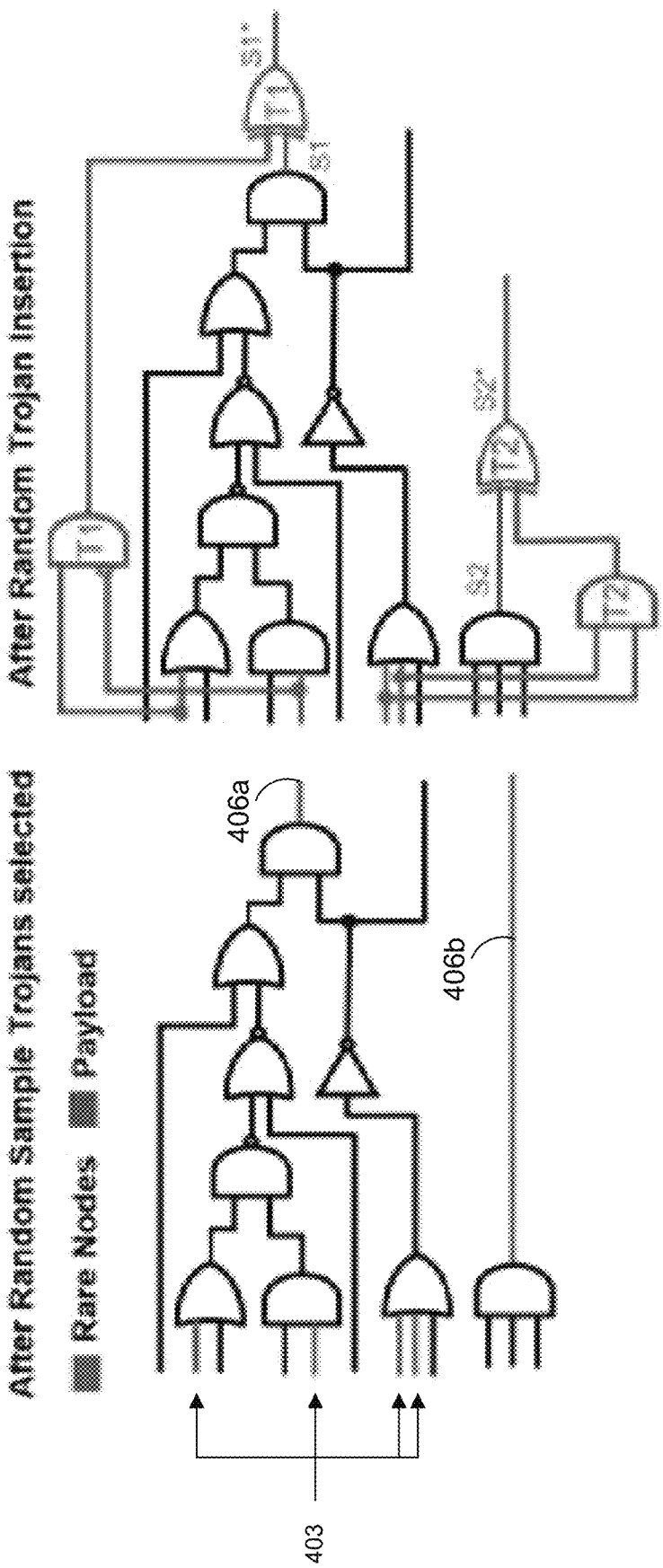
FIGS. 4A and 4B illustrates a circuit design after a combinational Trojan has been selected and inserted, according to various embodiments of the present disclosure.

Combinational: The generic combinational Trojan can comprise a sample structure with q trigger conditions connected together using an AND gate. The output of the AND gate can be connected to an XOR gate. In FIG. 4A, the design is an example design after generating a list of feasible Trojans. In FIG. 4A, reference number 403 refers to various rare nodes. Reference numbers 406a and 406b refer to different payloads. With input θ=0.2, q=2, r=2, N=2, type=comb, effect=func, and activ mech=trigger the design in FIG. 4B is generated.

Sequential: The generic sequential Trojan can comprise sample structure with q trigger conditions connected using an AND gate as shown in FIG. 5A. This trigger output can feed into a template 3-bit counter which executes the payload after the trigger condition activates 2³ times. In FIG. 5A, reference number 503 refers to various rare nodes. Reference number 506 refer to payload. In this non-limiting example, the Trojan inserted design for FIG. 5B is generated after the user inputs θ=0.2, q=3, r=3, N=1, type=seq, effect=func, and acti mech=trigger.

Template: The functional template Trojan option can allow for users to insert their own Trojan structure with q customizable trigger conditions and a chosen payload. If the user-provided payload is invalid, either due to the formation of combinational loop or unobservable node, the embodiments can prompt the user to identify a new payload or randomly select one. Additionally, users can format the trigger inputs to their gate-level template so that they may be properly substituted and inserted. For example, consider the template code snippet provided in FIG. 3A.

Figure 6B:
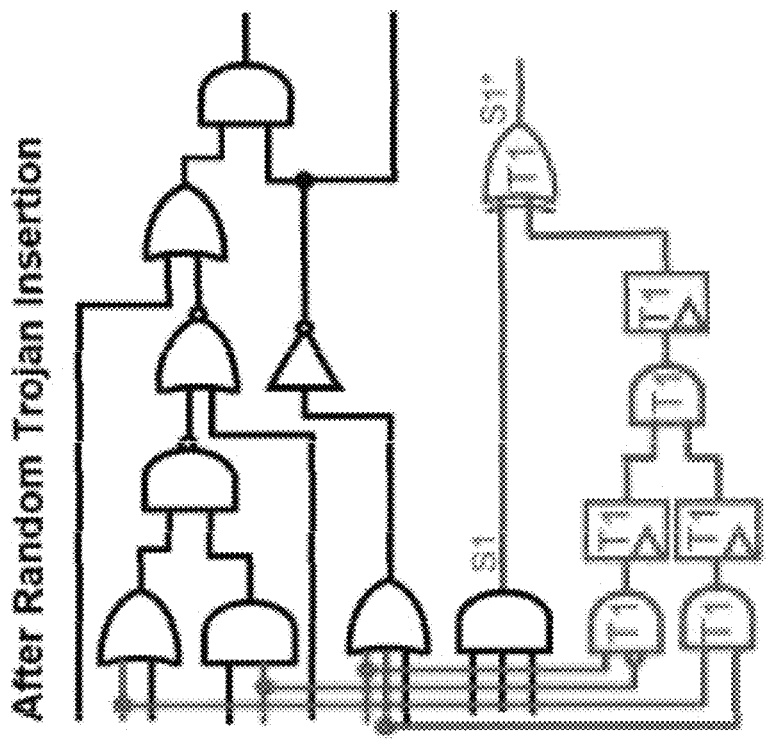
FIGS. 6A and 6B illustrates a circuit design after a template Trojan has been selected and inserted, according to various embodiments of the present disclosure.
Figure 6A:
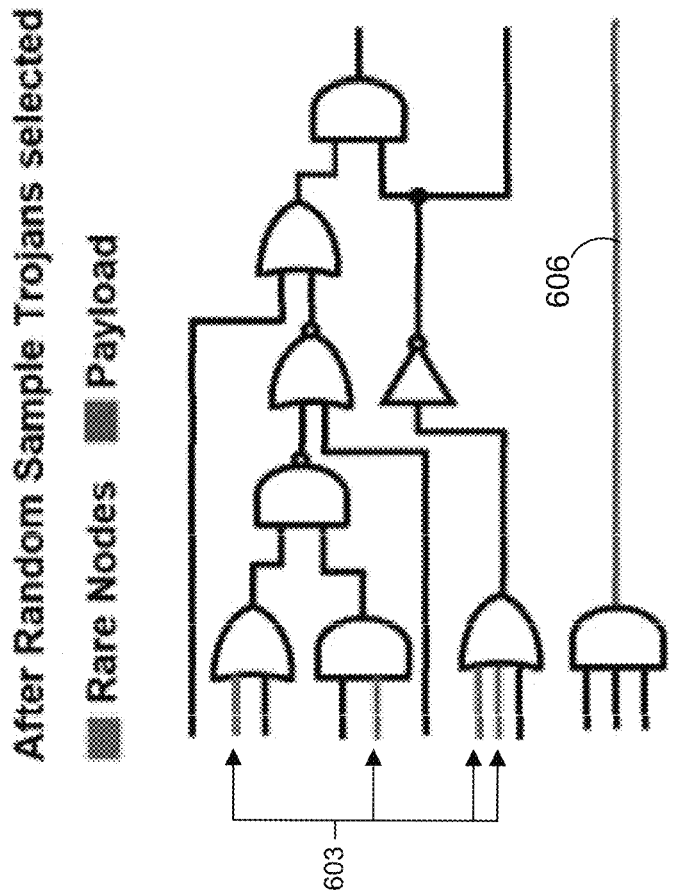

After running an exemplary embodiment with θ=0.2, q=4 N=1, type=template, effect=func, activ mech=trigger, and the template module in FIG. 6A, the Trojan is inserted into the design shown in FIG. 6B. In FIG. 6A, reference number 603 refers to various rare nodes. Reference number 606 refers to a payload. The corresponding template code snippet after insertion with the original design's signals is shown in FIG. 3B.

Figure 7B:
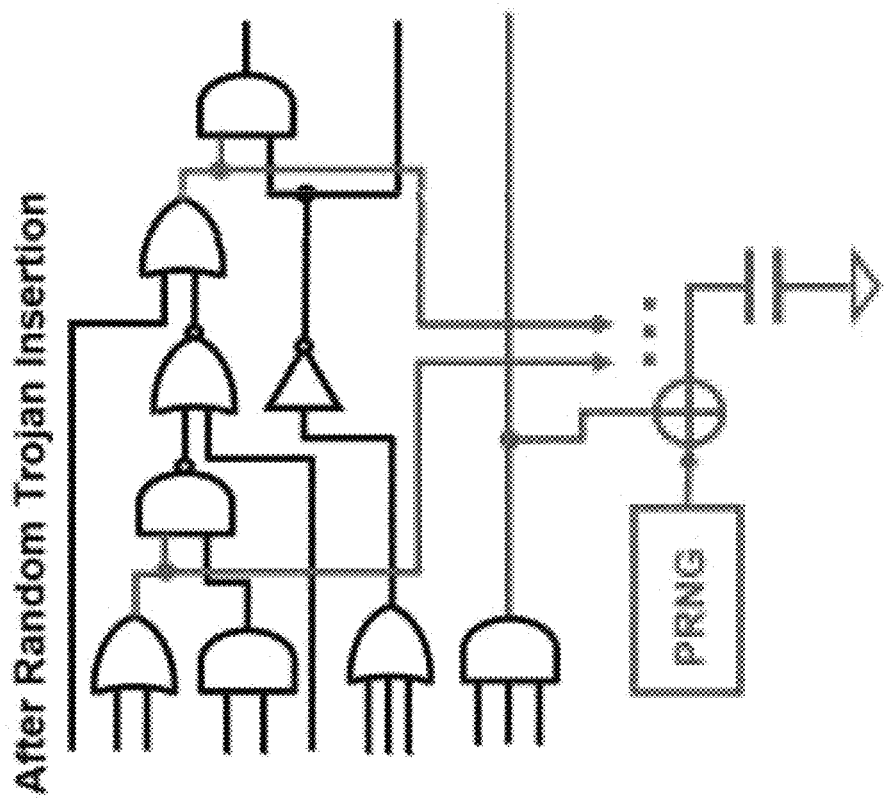
FIGS. 7A and 7B illustrates a circuit design after an always-on leakage Trojan has been selected and inserted, according to various embodiments of the present disclosure.
Figure 7A:
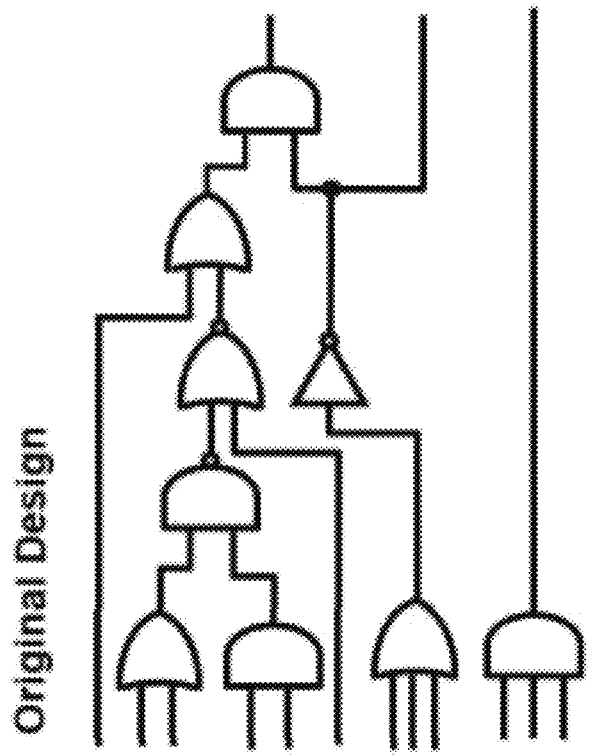

For leakage Trojans, the embodiments can allow for always-on or internally triggered activation mechanisms. Users must provide a template leakage circuit along with the critical information that is to be leaked. If critical signals are not specified, the embodiment may randomly select (e.g. via a random number generator function) existing internal signals to leak. In case of always-on Trojans, all tool configurations regarding Trojan triggers are disregarded. FIGS. 7A and 7B show a design with an always-on MOLES template leaking 3 randomly selected internal signals with N=1, type=template, effect=leakage, activ mech=always on.

Multiple Trojan Insertions: Users can also insert multiple Trojans in a design by specifying the configuration parameter N>1 in the Table in FIG. 1C. Inserting multiple Trojans can increase the threat level in certain scenarios. As a result, detecting one Trojan does not eliminate the possibility of the presence of another. For example, in the event that a functional Trojan is detected and removed from a third-party IP, another more stealthy leakage Trojan instance can remain. The existence of multiple Trojans in an IP can be more difficult and computationally expensive, especially when scaled to the System-on-Chip (SoC) level due to the increasing challenges in SoC verification.

Additional Configurations: In addition to the configurations mentioned above, the embodiments also provide support for scan-chain insertions, clock definitions, and footprint optimizations. For scan-chains, users must provide an SPF [what does "SPF" stand for] describing the scan-structure of the design. Multiple clocks can be specified by providing the clock's signal name along with the activation level. For sequential or combinational Trojan types, if specified, the embodiments may seek to construct a Trojan with minimal switching activity and gate-area using the provided specifications and netlist through trigger and payload gate structure. If the provided conditions cannot be met, the embodiments can report the achieved Trojan size and switching activity. Users can use this information to then adjust other parameters to help reach the target signature. By minimizing the side-channel footprint, this feature can help ensure low Trojan detectability.

In some embodiments, the Trojan benchmark application 100 can be used to construct malicious hardware test (e.g. Trojan) instances in analog and mixed-signal (AMS) designs. The disclosed approach of the various embodiments can be directly extended for AMS designs since an AMS Trojan can be viewed as a template that can be inserted in gate/transistor-level designs. It is feasible because AMS Trojans also have the same trigger and payload characteristics as digital Trojans. For example, a digital pulse (with low toggle rate during typical workload) can be the trigger for an analog Trojan, where the Trojan gets activated when the digital pulse is toggled with a high frequency for a long period of time.

Some non-limiting example use cases of the framework used by various embodiments includes: (1) IP Trust Verification: Enables development of powerful IP trust verification systems based on machine learning (ML) that does not require golden/reference model of the design. It allows generating an effective training set for an ML based classifier. (2) Unbiased Coverage Estimation for a Trust Verification Engine: Enables unbiased coverage estimation for any trust verification system (both IC and IP level). Existing static benchmarks (>100 in total) in TrustHub web portal provides bias in favor of detecting specific Trojan type. On the contrary, TRIT provides a random, unpredictable, and statistically significant dataset for reliable Trojan coverage estimation. (3) "Trusted by Design" Approach: Enables a trust-aware design flow. It can help a designer to identify uncovered Trojans (by a trust verification system) and then to modify the design to cover those Trojans at low overhead (similar to the practice of testability-aware design). (4) Big-data Analytics on Test Data: Enables application of big data analytics to the test data by creating millions of Trojan instances for an IP design. It can allow designers to analyze an IP's functional and parametric behavior using analytics routines and to potentially identify malicious changes.

Experiments

A. Experimental Setup

To demonstrate the effectiveness of the various embodiments of the present disclosure, Trojans were inserted Trojans into ISCAS-85 and ISCAS-89 benchmarks. The state-of-the-art Trojan detection method, Controllability and Observability for hardware Trojan Detection (COTD) technique, was evaluated using our benchmarks. A machine with Intel Core i5-3470 CPU @ 3.20 GHz and 8 GB of RAM was used for testing. The embodiments can support flattened gate-level designs written in Verilog. The current implementation can support two standard cell libraries (LEDA and SAED). COTD is an unsupervised machine learning approach for Trojan detection. Sandia Controllability/Observability Analysis Program (SCOAP) control-lability and observability values can be extracted from nets in a gate-level netlist using a third party validation tool for generating test patterns. The feature set can include a 2-dimensional vector with combinational controllability and combinational observability (CC, CO) values which are clustered with k-means clustering using k=3 in a simple Python script. In our evaluation of the COTD approach, sequential ISCAS benchmarks with combinational, or sequential Trojans were used. For each benchmark, Trojan instances with trigger nodes (r/q)=5/6, 6/6, and 7/7 were inserted. A low rare node threshold of $\theta=0.0001$ was chosen for most benchmarks. $\theta$ is adjusted up to 0.05 when the tool is unable to generate feasible Trojans at $\theta=0.0001$.

B. Results and Analysis

The results from evaluating COTD with one Trojan inserted designs from our tool are described in the Table in FIG. 8. Full-scan implementation is assumed for the original design and non-scan for Trojan insertions with sequential elements. The benchmarks are listed in the first column. The naming convention is B-Tq where B is the original benchmark, T is the Trojan type (c, s, t for comb., seq., and template, respectively) and q is the number of trigger nodes. For example, s13207-c2 is the s13207 benchmark infected with a 2-node trigger combinational Trojan. If the number of rare nodes r<q then the naming is B-T r_q. The next three columns describe our tool configurations in terms of number trigger nodes, rare threshold value $\theta$, and the Trojan type. Column 5 and 6 show the number of genuine signals and false negatives (FN) and the number of Trojan signals and false positives (FP). The last four columns provide information on the clustering itself by describing the cluster centroid for Trojan Cluster 1 (high CC values) and Trojan Cluster 2 (high CO values) and the minimum and maximum magnitude of the (CC, CO) pairs for genuine and Trojan signals. From the Table in FIG. 8, the following observations have been made:

1) In the presence of combinational Trojans, the COTD technique has a high false positive rate.
2) In the presence of sequential Trojans, the COTD technique has a low false positive rate.

While COTD does not produce any false negative signals, using Trojans generated from our tool caused COTD to generate false positives in all benchmarks. From the second observation, the false positives can be attributed to the low controllability of the payload gate and its fanout effect on the remaining circuit. The original design CC, CO for s13207, s15850, and s35932 are 1.414, 63.016, 1.414, 139.717, and 1.414, 12.018, respectively. In the Trojan inserted designs, the payload propagates its high CC and CO values to its fan-in and fan-out. Moreover, it is noted that the non-scan structure will automatically produce low controllability and observability values in third party validation tools from the complexity of sequential structures in ATPG tools. From this fact, it can be stated that COTD will most likely result in higher false positives in the presence of partial-scan designs—a common practice in industry to reduce area overhead and testing time compared to full-scan implementations. Additionally, the false positive rate may be affected in the cases where not all trigger nodes are rare which is the case for Trojans with r/q as 5/6.

Benchmarks are an important tool in the evaluation of novel techniques developed by researchers. In hardware security and trust, existing static trust benchmarks for Trojan detection provide a good foundation but are limited in Trojan variety, and robustness. They also do not evolve with new attack modalities being discovered. The embodiments of the present disclosure relate to a comprehensive automatic Trojan insertion framework with associated algorithms that provide users the ability to generate dynamic benchmarks with random Trojan insertions. Users can control several parameters regarding Trojan trigger, structure, payload type, and rarity. Additionally, future Trojan models are supported by allowing template Trojans. The embodiments can be used to evaluate Trojan detection methods from a red team vs blue team perspective demonstrated using a popular Trojan detection method.

Figure 9:
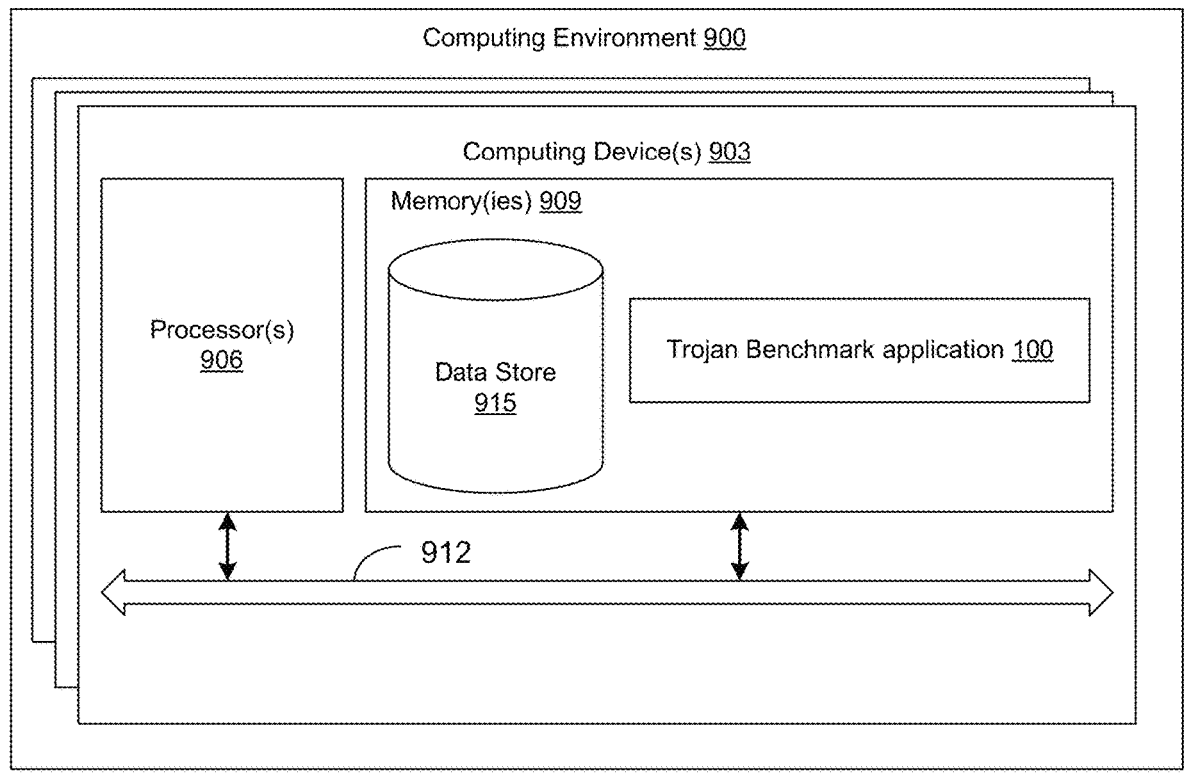
FIG. 9 is a schematic block diagram that provides one example illustration of a computing environment, according to various embodiments of the present disclosure.

With reference to FIG. 9, shown is a schematic block diagram of the computing environment 900 according to an embodiment of the present disclosure. The computing environment 900 includes one or more computing devices 903. Each computing device 903 includes at least one processor circuit, for example, having a processor 906 and a memory 909, both of which are coupled to a local interface 912. To this end, each computing device 903 may comprise, for example, at least one server computer or like device. The local interface 912 may comprise, for example, a data bus with an accompanying address/control bus or other bus structure as can be appreciated.

Stored in the memory 909 are both data and several components that are executable by the processor 906. In particular, stored in the memory 909 and executable by the processor 906 are list of main applications, and potentially other applications. Also stored in the memory 909 may be a data store 915 and other data. The data store 915 can represent memory used to store the list of rare nodes 107 and the list of feasible nodes 113. In addition, an operating system may be stored in the memory 909 and executable by the processor 906.

It is understood that there may be other applications that are stored in the memory 909 and are executable by the processor 906 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 909 and are executable by the processor 906. In this respect, the term "executable" means a program file that is in a form that can ultimately be run by the processor 906. Examples of executable programs may be, for example, a compiled program that can be translated into machine code in a format that can be loaded into a random access portion of the memory 909 and run by the processor 906, source code that may be expressed in proper format such as object code that is capable of being loaded into a random access portion of the memory 909 and executed by the processor 906, or source code that may be interpreted by another executable program to generate instructions in a random access portion of the memory 909 to be executed by the processor 906, etc. An executable program may be stored in any portion or component of the memory 909 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 909 is defined herein as including both volatile and nonvolatile memory and data storage components. Volatile components are those that do not retain data values upon loss of power. Nonvolatile components are those that retain data upon a loss of power. Thus, the memory 909 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 906 may represent multiple processors 906 and/or multiple processor cores and the memory 909 may represent multiple memories 909 that operate in parallel processing circuits, respectively. In such a case, the local interface 912 may be an appropriate network that facilitates communication between any two of the multiple processors 906, between any processor 906 and any of the memories 909, or between any two of the memories 909, etc. The local interface 912 may comprise additional systems designed to coordinate this communication, including, for example, performing load balancing. The processor 906 may be of electrical or of some other available construction.

Although list of main applications, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 1A and the algorithm of FIG. 1B show the functionality and operation of an implementation of portions of the Trojan benchmark application 100. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 906 in a computer system or other system. The machine code may be converted from the source code, etc. If embodied in hardware, each block may represent a circuit or a number of interconnected circuits to implement the specified logical function(s).

Although FIGS. 1A and 1B show a specific order of execution, it is understood that the order of execution may differ from that which is depicted. For example, the order of execution of two or more blocks may be scrambled relative to the order shown. Also, two or more blocks or steps shown in succession in FIGS. 1A and 1B may be executed concurrently or with partial concurrence. Further, in some embodiments, one or more of the blocks shown in FIGS. 1A and 1B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the Trojan benchmark application 100, that comprises software or code can be embodied in any non-transitory computer-readable medium for use by or in connection with an instruction execution system such as, for example, a processor 906 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including list of main applications, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 903, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium having a computer-executable program stored thereon that, when executed, causes a computing device to at least:
   receive a gate level description of a circuit design and a plurality of configuration parameters;
   calculate a signal probability for a plurality of nodes in the circuit design;
   identify a plurality of rare nodes in the circuit design based at least in part on a signal probability threshold and the signal probability for the plurality of nodes;
   generate a Trojan sample population that comprises a plurality of Trojan test instances based at least in part on the plurality of rare nodes;
   generate a feasible Trojan population that comprises a subset of the plurality of Trojan test instances by verifying a trigger condition with a payload outcome or a payload outcome alone associated with the plurality of Trojan test instances, wherein the verification of the trigger condition with the payload outcome or the payload outcome alone associated with the plurality of Trojan test instances identifies an invalid subset of the plurality of Trojan test instances which have an invalid trigger condition or an invalid payload outcome, and the feasible Trojan population is generated by removing the invalid subset of the plurality of Trojan test instances from the Trojan sample population;
   generate a Trojan test instance based at least in part on a random selection from the feasible Trojan population; and
   insert the Trojan test instance into the gate level description of the circuit design based at least in part on the plurality of configuration parameters.

2. The non-transitory computer-readable medium of claim 1, wherein calculating the signal probability for the plurality of nodes further comprises performing at least one of a functional simulation or a transition probability technique for the circuit design.

3. The non-transitory computer-readable medium of claim 1, wherein generating the Trojan sample population is further based at least in part on a quantity of triggering nodes specified in the plurality of configuration parameters and a selection of a quantity of a plurality of non-rare nodes in the circuit design.

4. The non-transitory computer-readable medium of claim 3, wherein the computer-executable program, when executed, further causes the computing device to at least identify the plurality of non-rare nodes based at least in part on the signal probability for a subset of the plurality nodes exceeding the signal probability threshold.

5. The non-transitory computer-readable medium of claim 1, wherein at least some of the plurality of Trojan test instances comprise at least one rare node and at least one non-rare node, and wherein generating the Trojan sample population further comprises a random selection of a subset of the Trojan sample population.

6. The non-transitory computer-readable medium of claim 1, wherein generating the feasible Trojan population further comprises removing a respective Trojan instance from the feasible Trojan population in response to a determination of an invalid triggering condition or an invalid payload outcome associated with the respective Trojan instance.

7. The non-transitory computer-readable medium of claim 1, wherein the generation of the Trojan test instance is further based at least in part on user-specified criteria from the plurality of configuration parameters.

8. The non-transitory computer-readable medium of claim 7, wherein the user-specified criteria comprises at least one of a Trojan type, a Trojan structure, and a quantity of Trojan instances to insert.

9. The non-transitory computer-readable medium of claim 8, wherein the Trojan structure comprises at least one of a combination structure, a sequential structure, and a template structure that is specified by a user.

10. A system for evaluating a software tool that detects malicious hardware modifications, comprising:
a computing device;
an application executable in the computing device, wherein, when executed, the application causes the computing device to at least:
receive hardware description language code that represents a circuit design;
calculate a signal probability for a plurality of nodes in the circuit design;
identify a plurality of rare nodes in the circuit design based at least in part on a signal probability threshold and the signal probability for the plurality of nodes;
generate a test sample population that comprises a plurality of test instances based at least in part on the plurality of rare nodes;
generate a feasible test population that comprises a subset of the plurality of test instances by verifying a trigger condition with a payload outcome or a payload outcome alone associated with the plurality of test instances, wherein the verification of the trigger condition with the payload outcome or the payload outcome alone associated with the plurality of test instances identifies an invalid subset of the plurality test instances which have an invalid trigger condition or an invalid payload outcome, and the feasible test population is generated by removing the invalid subset of the plurality of test instances from the test sample population;
generate a malicious hardware test instance based at least in part on a random selection from the feasible test population; and
generate modified hardware description code by inserting the malicious hardware test instance into the hardware description language code, wherein the modified hardware description code is configured to evaluate a software tool that detects malicious hardware modifications.

11. The system of claim 10, wherein the circuit design comprises at least one of an analog circuit design, a digital circuit design, and a mixed signal circuit design.

12. The system of claim 10, wherein the hardware description language code comprises at least one of gate level description code, register transfer level code, and transaction level code.

13. The system of claim 10, wherein calculating the signal probability for the plurality of nodes further comprises performing a functional simulation of the circuit design.

14. The system of claim 10, wherein generating the test sample population is further based at least in part on a quantity of triggering nodes specified in a plurality of configuration parameters and a selection of a quantity of a plurality of non-rare nodes in the circuit design.

15. The system of claim 14, wherein, when executed, the application further causes the computing device to at least identify the plurality of non-rare nodes in the circuit design based at least in part on the signal probability for a subset of the plurality nodes exceeding the signal probability threshold.

16. The system of claim 14, wherein at least some of the plurality of test instances comprise at least one rare node and at least one non-rare node, and wherein generating the test sample population further comprises a random selection of a subset of the test sample population.

17. A method for evaluating a software tool that detects malicious hardware modifications, comprising:
receiving, via a computing device, hardware description language code that represents a circuit design;
calculating, via the computing device, a signal probability for a plurality of nodes based at least in part on the circuit design;
identifying, via the computing device, a plurality of rare nodes in the circuit design based at least in part on a signal probability threshold and the signal probability for the plurality of nodes;
generating, via the computing device, a Trojan sample population that comprises a plurality of Trojan test instances based at least in part on the plurality of rare nodes;
generating, via the computing device, a feasible Trojan population that comprises a subset of the plurality of Trojan test instances by verifying a trigger condition with a payload outcome or a payload outcome alone associated with the plurality of Trojan test instances, wherein the verification of the trigger condition with the payload outcome or the payload outcome alone associated with the plurality of test instances identifies an invalid subset of the plurality test instances which have an invalid trigger condition or an invalid payload outcome, and the feasible Trojan population is generated by removing the invalid subset of the plurality of Trojan test instances from the Trojan sample population;
generating, via the computing device, a Trojan test instance based at least in part on a random selection from the feasible Trojan population; and
generating, via the computing device, modified hardware description code by inserting the Trojan test instance into the hardware description language code, wherein the modified hardware description code is configured to evaluate a software tool that detects malicious hardware modifications.

18. The method of claim 17, wherein the circuit design comprises at least one of a simulated analog circuit design, a simulated digital circuit design, and a simulated mixed signal circuit design.

19. The method of claim 17, wherein the hardware description language code comprises at least one of gate level description code, register transfer level code, and transaction level code.

20. The method of claim 17, wherein generating the Trojan sample population is further based at least in part on a quantity of triggering nodes specified in a plurality of configuration parameters and a selection of a quantity of a plurality of non-rare nodes in the circuit design.

* * * * *